United States Patent [19]

Matsumoto

[11] Patent Number: 5,003,752
[45] Date of Patent: Apr. 2, 1991

[54] WRAPPING METHOD AND APPARATUS

[76] Inventor: Ryozo Matsumoto, 239-9, Oaza-Tanaka, Sasaguri-cho, Kasuya-gun, Fukuoka-ken, 811-24, Japan

[21] Appl. No.: 351,585

[22] Filed: May 15, 1989

[30] Foreign Application Priority Data

May 16, 1988 [JP] Japan .................................. 63-119978
Sep. 14, 1988 [JP] Japan .................................. 63-231000

[51] Int. Cl.⁵ .............................................. B65B 11/04
[52] U.S. Cl. ........................................ 53/399; 53/441; 53/556; 53/587
[58] Field of Search ................. 53/399, 441, 556, 587, 53/588; 264/290.2; 26/72

[56] References Cited

U.S. PATENT DOCUMENTS

| | | | |
|---|---|---|---|
| 2,597,041 | 5/1952 | Stokes | 53/556 X |
| 2,728,941 | 1/1956 | Alles | 26/72 X |
| 3,148,410 | 9/1964 | Laurie | |
| 4,087,226 | 5/1978 | Mercer | 264/290.2 |
| 4,116,892 | 9/1978 | Schwarz | 264/290.2 |
| 4,144,008 | 3/1979 | Schwarz | |
| 4,144,697 | 3/1979 | Suga | 53/556 |
| 4,153,751 | 5/1979 | Schwarz | |
| 4,223,059 | 9/1980 | Schwarz | |
| 4,251,585 | 2/1981 | Schwarz | |
| 4,285,100 | 8/1981 | Schwarz | |
| 4,368,565 | 1/1983 | Schwarz | 264/290.2 |
| 4,374,690 | 2/1983 | Canterino | 264/290.2 |
| 4,418,510 | 12/1983 | Lancaster | 53/582 X |
| 4,497,159 | 2/1985 | Lancaster, III | 53/556 |
| 4,722,170 | 2/1988 | Ball et al. | 53/556 |

FOREIGN PATENT DOCUMENTS

| | | | |
|---|---|---|---|
| 81328 | 6/1983 | European Pat. Off. | 53/556 |
| 271256 | 6/1988 | European Pat. Off. | 53/556 |
| 400589 | 10/1933 | United Kingdom | 264/290.2 |

Primary Examiner—John Sipos
Attorney, Agent, or Firm—Cushman, Darby & Cushman

[57] ABSTRACT

A plastic film is stretched both breadthwise and longitudinally just before it is wound around a load for wrapping. Stretching of the film is performed by passing the film between stretching rolls each having alternate peripheral ridges and grooves and arranged such that the ridges on each roll mesh with the grooves on the other roll.

5 Claims, 8 Drawing Sheets

WRAPPING METHOD AND APPARATUS

FIELD OF THE INVENTION

The present invention relates to a method and an apparatus for wrapping a load with a plastic film while stretching or drawing the plastic film breadthwise and longitudinally.

DESCRIPTION OF THE PRIOR ART

Various wrapping apparatus which wrap a load with plastic films while drawing the plastic films are commercially available. These known apparatus employ direct or indirect friction means for constraining films during wrapping. More specifically, the constraint is effected by applying a friction to the film roll itself (direct friction) or to the portion of the film from the roll (indirect friction). A pallet and the load to be wrapped serve as a winding mandrel which provides all tensile forces necessary for drawing the film.

Figure 5:
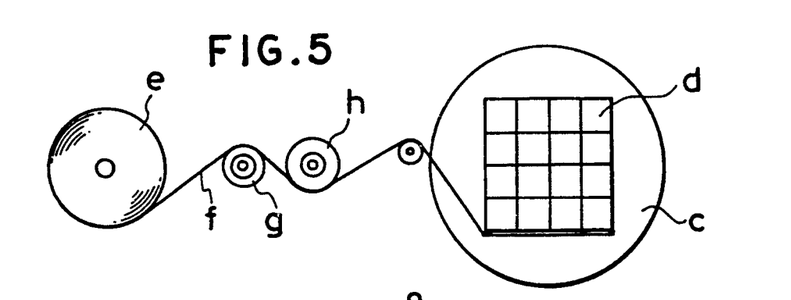
FIG. 5 is an illustration of a conventional wrapping apparatus.

Various patent applications have been filed on wrapping methods and apparatus which employ stretching of plastic films. For instance, Japanese Patent Examined Publication No. 61-27254, entitled "Wrapping Method and Apparatus" discloses an apparatus in which, as shown in FIG. 5, a load (d) placed on a turntable (c) is wrapped with a plastic film (f) supplied from its roll on a support post (e) which is spaced by a predetermined distance from the turntable (c), through spaced-apart primary and secondary rolls (g) and (h) which are intended for the purpose of effecting pre-drawing or pre-stretching of the film. Namely, the film (f) is drawn under the actions of the primary roll (g) and the secondary roll (h) and subsequently, the load (d) is wrapped with the film (f) thus drawn.

PROBLEMS TO BE SOLVED BY THE INVENTION

The breadth or height of the load (d) placed on the turntable (c), however, is not always equal to the breadth of the film (f). When the load (d) has a breadth greater than that of the film (f), it is necessary to vertically shift the film (f) relative to the load during wrapping so that the load may be wrapped by a plurality of turns of the film in a partially overalapping manner. Another problem is that the load (d) tends to fall down during the wrapping particularly when its weight is small. In addition, the apparatus is generally large in size and has a complicated construction. Furthermore, the wrapping with a plurality of turns of film unecomonically requires a longer length of the film.

An object of the present invention is to provide a wrapping method and apparatus in which the plastic film is drawn breadthwise just before wrapping a load with the film, thereby overcoming the above-described problems of the prior art.

MEANS FOR THE SOLVING THE PROBLEM

To this end, according to one aspect of the present invention, there is provided a method for wrapping a load with a wrapping plastic film from its roll, by placing said load on a turntable, rotating said load or by revolving said roll of film around said load held stationary to extract said film from said roll to the load, said method comprising; preparing a pair of stretching rolls having their vertical axes and disposed between said load and said roll of film, said stretching rolls having alternate peripheral ridges and peripheral grooves and being arranged such that the peripheral ridges on each roll mesh with the peripheral grooves on the other roll, passing said film extracted from said roll between said meshed stretching rolls, stretching said film both breadthwise and longitudinal by rotating said stretching rolls at different speeds and wrapping said load with said spread and stretched film.

According to another aspect of the invention, there is provided a wrapping apparatus comprising: a combination of a turntable for carrying a load to be wrapped and a support post carrying a roll of wrapping plastic film and disposed at a predetermined distance from said turntable or, alternatively, a combination of a stationary table carrying said load and a support post carrying said roll of said wrapping film and disposed on an arm revolvable around said stationary table; a pair of stretching rolls having their vertical axes and alaternate peripheral ridges and peripheral grooves, said stretching rolls being arranged such that the peripheral ridges son each roll mesh with the peripheral grooves on the other roll; means for rotatively driving said stretching rolls; at different spreads and spreaders arranged between said stretching rolls and said turntable or said stationary table and capable of grasping the edges of said film so as to spread said film breadthwise.

In a preferred embodiment, said spreaders are arranged such that spreaders is adjustable in accordance with the height of said load. The spacing between the stretching rolls is adjustable. Each of said spreaders comprises a support member and a plurality of disc-like rollers rotatably mormted on said support member for engaging and holding the edge of the film to spread the stretched film breadthwise.

Wrapping method and apparatus in accordance with the present invention will be described hereinunder in more detail with reference to the accompanying drawing in which.

Figure 1:
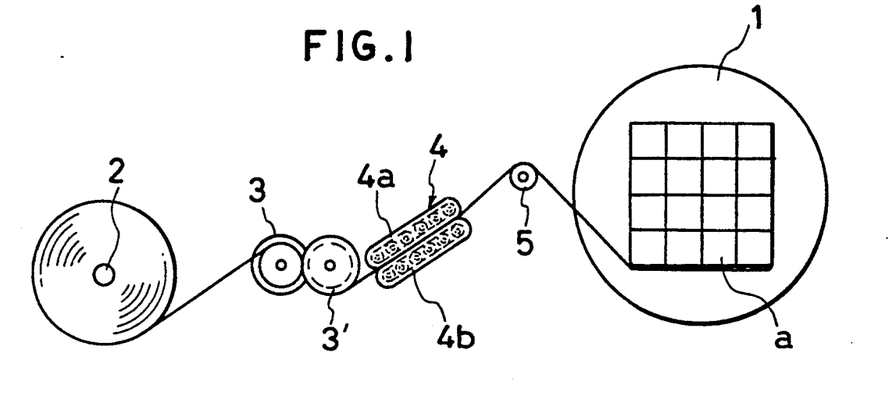
FIG. 1 is an illustration of an arrangement for carrying out the method of the present invention.
Figure 2:
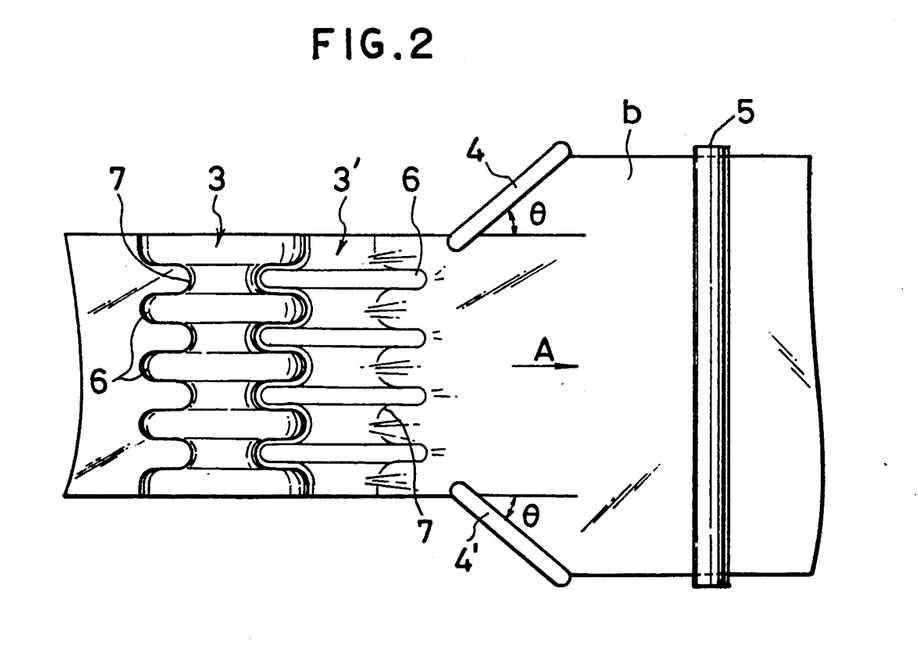
FIG. 2 is an elevational view of essential portions of an apparatus of the present invention for the purpose explanatory of the breadthwise stretching or drawing of a wrapping plastic film which is performed by stretching rolls.

Referring to FIG. 1, a load (a) placed on a turntable 1 is wrapped with a plastic film (b) from its roll on a support post 2 which is spaced by a predetermined distance from the turntable 1. The film from the roll is passed through stretching rolls 3, 3' which are arranged between the turntable 1 and the support post 2. The stretching rolls have their vertical axes and may be of configurations such that they mesh with each other. The film thus drawn longitudinally and breadthwise through the stretching roll is wound around the load (d) through film spreaders 4, 4' and an idler 5. More specifically, as shown in FIG. 2, the stretching rolls 3, 3' have peripheral ridges 6 and grooves 7 formed alternately on their outer peripheral surfaces and are arranged such that the ridges 6 on each roll mesh with the grooves 7 on the other roll. In addition, these stretching rolls are rotatively driven in opposite directions such that one 3' of the rolls exhibits a greater peripheral speed than the other roll 3.

In consequence, the film (b) which passes between both rolls 3, 3' is forcibly drawn both breadthwise and longitudinally by the effects of the meshed ridges 6 and grooves 7. Namely, the film (b) coming out the rolls 3, 3' in intermeshed relation has been stretched in conformity with the profiles of the ridges 6 and grooves 7 and the thus stretched film is grasped at its both breadthwise edges by a pair of spreaders 4, 4' so as to be developed or spread breadthwise at an angle $\theta$. The angle $\theta$ is determined such that the distance between the pair of spreaders 4. 4' equals to the breadth of the film (b) after stretching of the film performed breadthwise by the stretching roll 3'. Thus, the angle $\theta$ is controllable by suitably selecting the numbers and configurations of the peripheral ridges 6 and the peripheral grooves 7 of the stretching rolls 3,3'.

The spreaders 4, 4' are so arranged as to move at a film feed speed in conformity with the speed at which the film (d) delivered from the downstream stretching roll 3' runs in the direction of an arrow A. Repressing the running speed of the film (b) in the direction of the arrow A by $V_1$, the speed of the spreaders 4, 4' is given by $V_1/\cos \theta$.

The film (b) developed into a required breadth by the spreaders is then wound through the idler 5 around the load (b) placed on the turntable 1.

Figure 3:
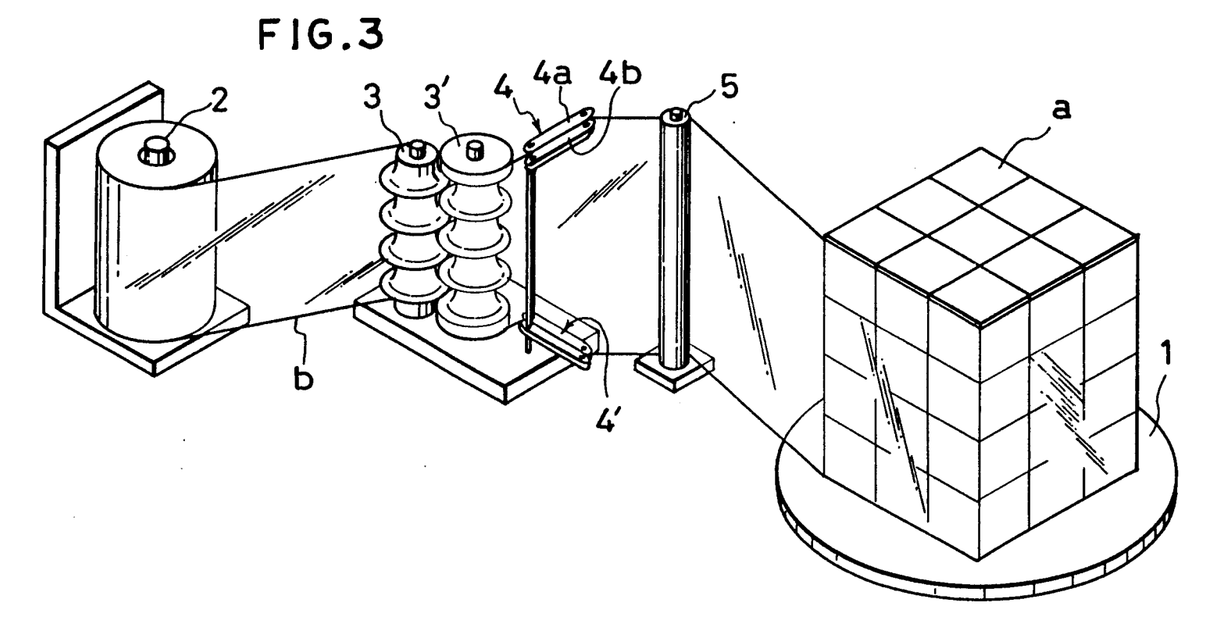
FIG. 3 is a perspective view of an embodiment of the wrapping apparatus of the present invention.
Figure 4:
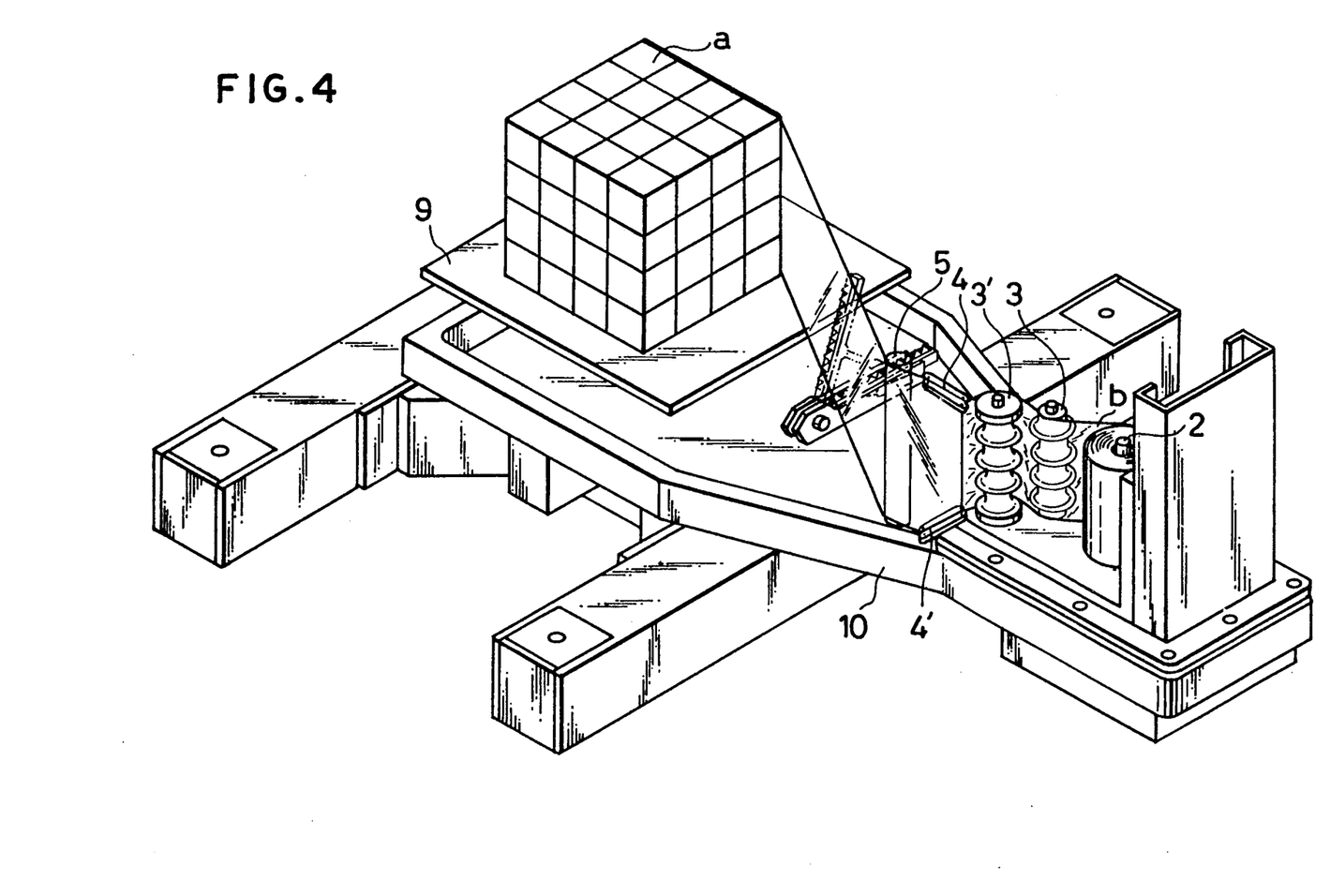
FIG. 4 is a perspective view of another embodiment of the present invention.

Each of the spreaders 4, 4' may be of an endless-belt type mechanism including a pair of driven endless belts 4a, 4b as shown in FIGS. 1, 3 and 4, trains of rollers, or any other suitable mechanism which can optimize the feed of the film to the load to be wrapped.

FIG. 3 illustrates an embodiment of the wrapping apparatus in accordance with the present invention. A roll of plastic film (b) is held on a support post 2. The leading end of the film (b) is passed through a nip between stretching rolls 3, 3' which are rotatively driven by means of drive units 8 including electric motors. Rotation speeds of the rolls are adapted to be controllable independently. In consequence, the film (b) is drawn breadthwise and longitudinally in a corrugated form under the effects of the intermeshed peripheral ridges 6 and peripheral grooves 7 on both drawing rolls 3, 3'. The film (b) thus drawn is grasped at its both breadthwise edges by a pair of spreaders 4, 4' so as to be developed into a predetermined breadth and is then wound through an idler 5, around a load (a) on the turntable which is rotated at a peripheral speed greater than the speed of the film delivered from the spreader 4, 4'.

FIG. 4 shows another embodiment in which the load (a) is held stationary while the system for supplying and stretching the film (b) is revolved around the load (a) so as to wrap the load (b). More specifically, in this embodiment, the support post 2 is carried on a rotatry arm 10 which is rotatable around a table 9 on which the load (a) is placed. The arm 10 also carries vertical stretching rolls 3, 3' which are arranged to intermesh with each other. The arm 10 further carries spreaders 4, 4' arranged between the stretching rolls 3, 3' and the table 9. In operation, the film (b) from the roll on the support post 2 is wound around the load (a) while being drawn both longitudinally and breadthwise as a result of revolution of the supply system around the load (a) held on the table 9.

Figure 6:
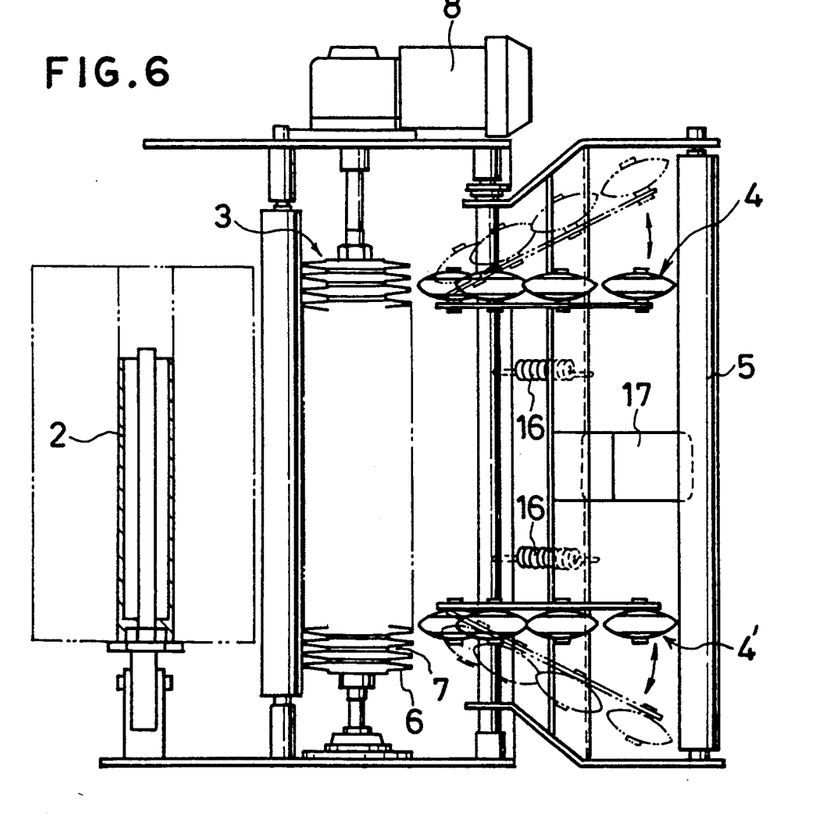
FIG. 6 is a side elevational view of an example of a stretcher unit incorporated in a wrapping machine embodying the present invention.
Figure 7:
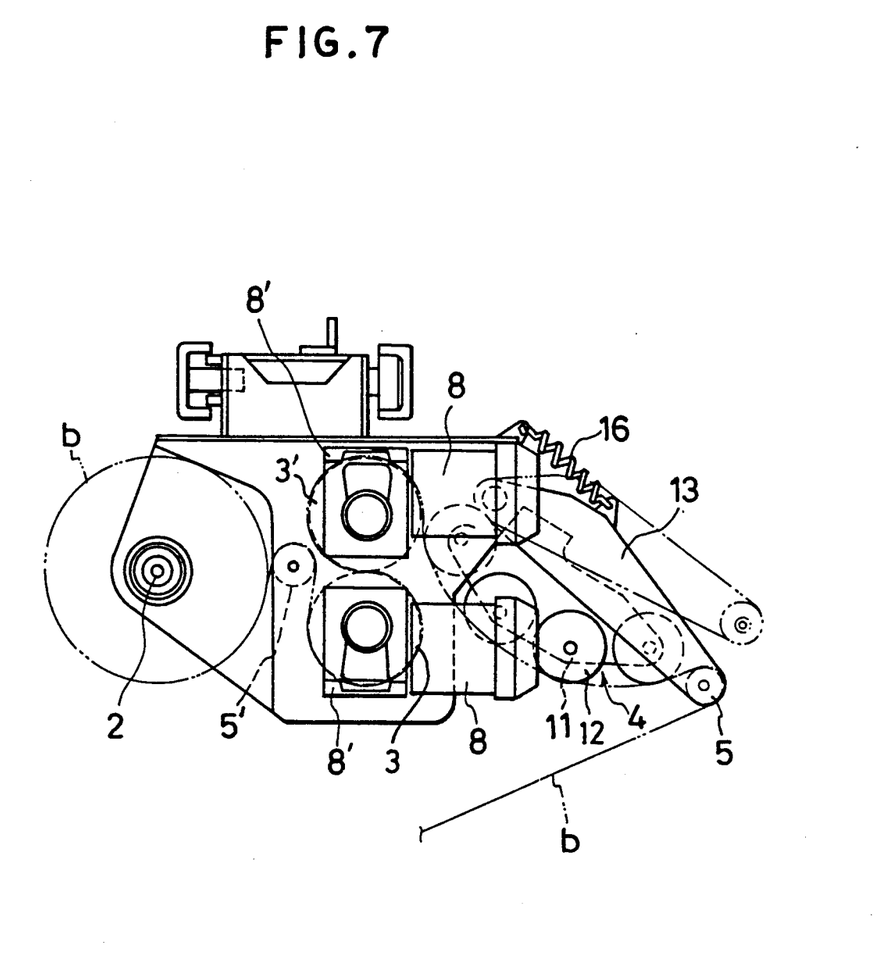
FIG. 7 is a plan view thereof.

Referring to FIGS. 6 and 7, there is shown a stretcher unit A incorporated in the wrapping apparatus of the present invention. The stretcher unit A has a support post 2, an idler 5' stretching rolls 3, 3', spreaders 4, 4', and a feed idler 5 all mounted on a frame. The support post 2 carries a roll of a wrapping plastic film b. The leading portion of the film b from the film roll is passed between the stretching rolls 3, 3' via the idler 5' which is disposed between the support post 2 and the stretching rolls 3, 3'. The stretching rolls 3 or 3' are provided with alternate peripheral ridges 6 and peripheral grooves 7 and are arranged such that the peripheral ridges 6 on each roll 3, 3' mesh with the peripheral grooves 7 on the other roll. The clearance between the stretching rolls 3 and 3' can be adjusted by means of adjusting mechanisms 8', 8' which may be cam-type mechanisms. In addition, the stretching rolls 3, 3' are rotatively driven by electric or hydraulic motors 8 on the frame in opposite directions and in such a manner that the downstream stretching roll 3' exhibits a peripheral speed greater than that of the stretching roll 3.

Therefore, the film b introduced between the stretching rolls 3, 34 is forcibly drawn or stretched both breadthwise and longitudinally under the effect of the intermeshed peripheral ridges 6 and the peripheral grooves 7. Thus, the film b coming out the clearance between the stretching rolls 3, 3' has been drawn in confoirmity with the configurations or profiles of the stretching rolls 3, 3'. The breadth to which the film b is drawn can be controlled by controlling the clearance between the stretching rolls 3, 3' and the speeds of rotation of these rolls.

Figure 8:
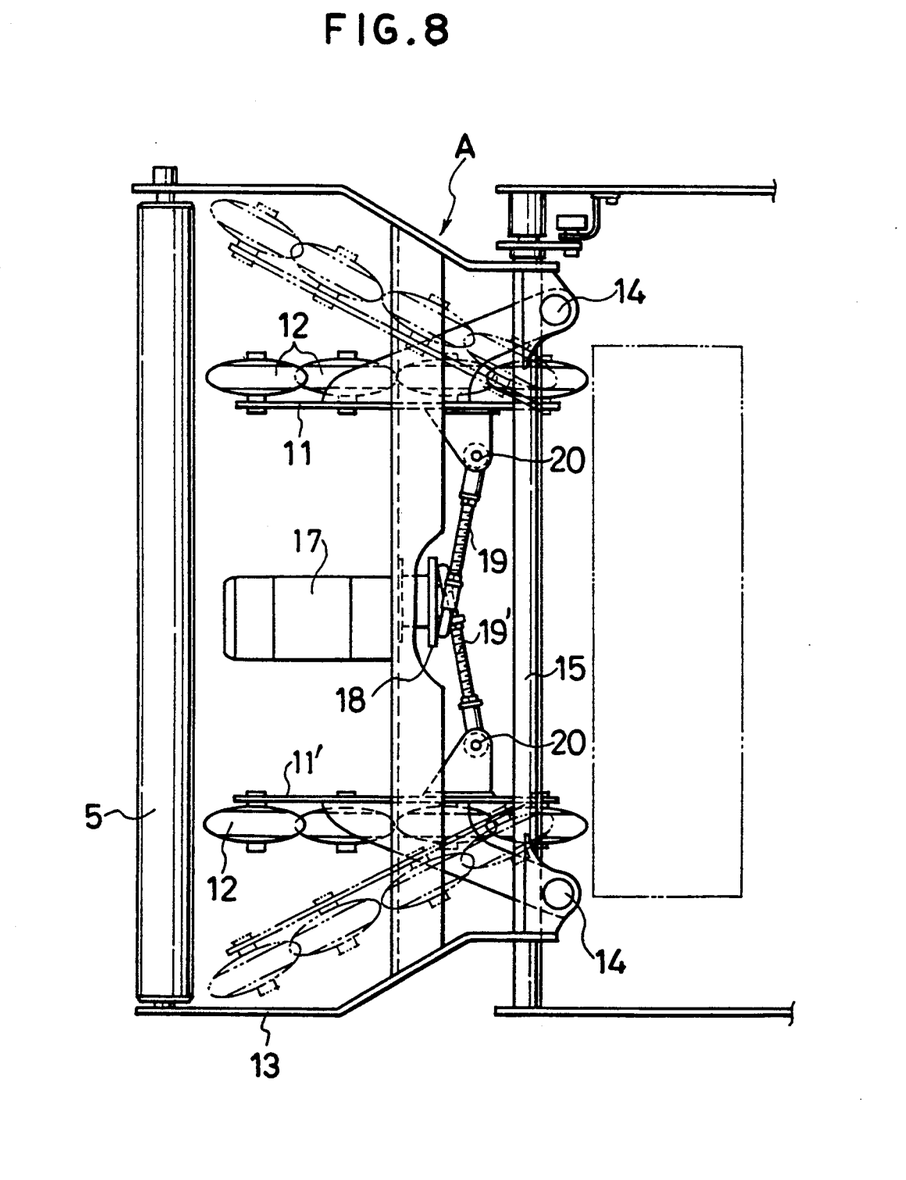
FIG. 8 is a side elevational view of the portion of the stretcher unit, but showing a mechanism for controlling the diverging angle of spreaders.
Figure 9:
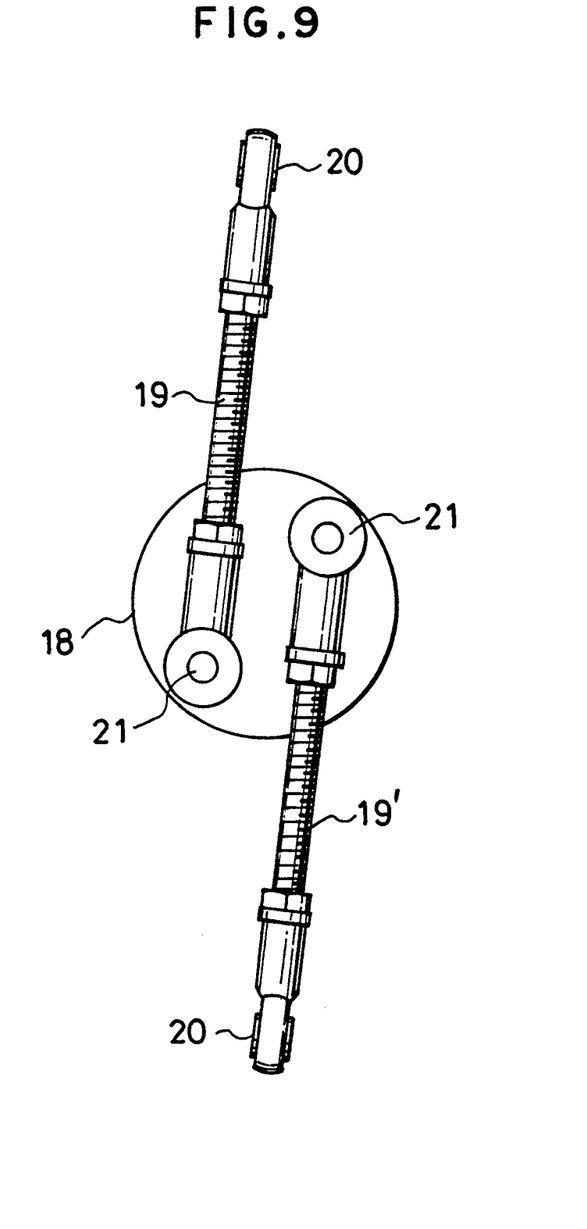
FIG. 9 is a front view of the mechanism of FIG. 8.

The stretched film b from the clearance between the drawing rolls 3, 3', is then grasp and fed by the spreaders 4, 4' which act to spread the film b breadthwise at a diverging angle $\theta$. Each of the spreaders 4, 4' comprises disk-like rollers 12 rotatably mounted on support member 11 or 11' which is pivoted to a yoke 13 at 14. The yoke 13 is pivotably connected to the frame by means of a fixed shaft 15 and the idler 5 is supported on the yoke 13. Springs 16 are connected between the frame and the yoke. The film b stretched by the stretching rolls 3, 3' has a corrugated form. Both the edges of this film b are engaged and held by the outer peripheral edges of the rollers 12, so that the corrugated film is spread breadthwise and fed towards the idler 5. The diverging angle of the spreaders 4, 4' is controllable by means of a angle control mechanism C. As can be seen in FIGS. 8 and 9, the angle control mechanism C includes a hydraulic or electric motor 17 supported on the york 13 between the spreaders 4, 4' and having a rotatable disk 18 and rods 19, 19' which are connected at their one ends to support members 11, 11' by means of universal joints 20 and at their other ends to the disk 18 of the motor 17 in its off-center positions by means of universal joints 21. In operation rotation of the disk 18 by the motor 17 causes the support members 11, 11' to be swung around the pivot axis 14, 14' through the rods 19, 19' as shown by imaginary lines. The arrangement shown in FIGS. 8 and 9 is only illustrative and various suitable means such as a hydraulic or pneumatic cylinder may by used for changing the diverging angle of the spreaders 4, 4'. Thus, the type of the mechanism C can be selected optimumly in accordance with various conditions.

Figure 10:
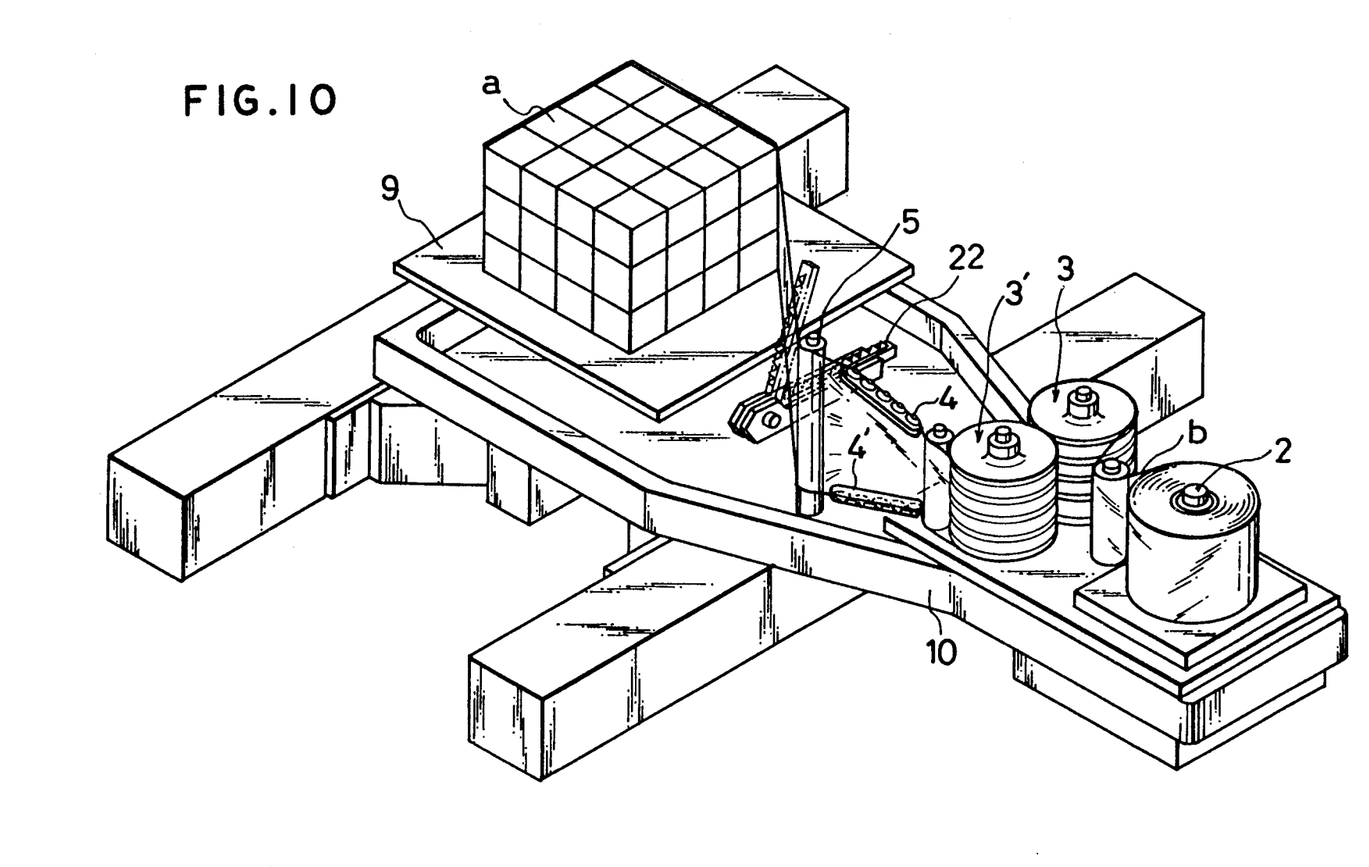
FIG. 10 is a perspective view of an embodiment of the wrapping apparatus of the present invention with the stretcher unit shown in FIG. 6.

FIG. 10 shows an embodiment in which the stretcher unit A revolves around a stationary table 9 carrying a load a to wrapped. In this embodiment, a rotary arm 10 rotatable around the table 9 carries the stretcher unit A which includes the support post 2, idler 5' stretching rolls 3, 3', spreaders 4, 4' and feeding idler 5. In this embodiment, therefore, the film b from the film roll on the support post 2 are stretched both breadthwise and longitudinally and then, wound around the load a as the stretcher unit A revolves around the stationary load a on the table 9 as a result of rotation of the rotary arm 10.

In operation, leading end of the film b from the roll on the support post 2 is passed between the stretching rolls 3, 3'. The size of the clearance between the rolls 3, 3' has been adjusted beforehand to allow the passage of the leading end of the film b with no load, i.e., no drawing force, applied thereto. The leading end of the film b is then secured to the load a to be wrapped, by means of a chuck device (not shown) provided on the rotary arm 10. Then, the diverging angle of the spreaders 4, 4' and the clearance between the drawing rolls 3, 3' are controlled in accordance with the size (breadth and height) of the load a so as to enable the film b to be stretched optimumly for wrapping the load a. As the rotary arm 10 further rotates, the film b is continuously extracted and stretched both breadthwise and longitudinally so as to be wound around the load a thereby wrapping the load a. After finishing the winding, the film b is severed by a cutting device 22, thus completing the wrapping of the load.

The wrapping apparatus can be operated with the spreaders 4, 4' set at the spacing corresponding to the breadth of the film b delivered by the drawing rolls 3, 3', so that the corrugated film b stretched by the intermeshed stretching rolls 3, 3' is wound around the load without being spread by the spreaders 4, 4'. In such a case, air spaces are formed between the surface of the load a and the corrugated wrapping film b so as to produce buffering effect against any external impact or force which may be applied to the wrapped load.

Although the described embodiment employs an arrangement in which the stretcher unit A is adapted to revolve around the stationary load so as to wind the film around the load, it will be understood by those skilled in the art that the same effect can be produced by arranging such that the load is turned by a turntable so as to wind the stretched film around itself.

As will be understood from the foregoing description, according to the present invention, the film (b) is drawn not only in the longitudinal direction but also breadthwise so that the load (a) can be wrapped without requiring the film to be progressively shifted, in contrast to the known wrapping method and apparatus which require films to be shifted to wrap a load with a plurality of partially overlapping turns of the film. Thus, according to the present invention, the film (b) can be wound several times at the constant height, i.e., in a completely overlapping manner so that the load (a) can be wrapped with a constant and uniform tensile force.

In addition, drawing or stretching film breadthwise and longitudinally enables the film (b) to be used in a fully drawn state to develop the maximum strength.

As has been described, according to the present invention, a wrapping film is drawn both breadthwise and longitudinally so that the wrapping can be performed without requiring vertical shaft of the film which is necessary in the known wrapping apparatus for the purpose of wrapping a load with a plurality of partially overlapping turns of the film. In addition, it is possible to avoid any falling down of the load during the wrapping even when a weight of the load is less. In addition, the uniform application of wrapping tensile force eliminates any damage to the load which may otherwise be caused by a local concentration or an uneven application of wrapping force to the load.

I claim:

1. A method for wrapping a load with a wrapping plastic film from its roll, by creating relative rotation between said roll of film and the load to extract said film from said roll of film onto the load, said method comprising: preparing a pair of stretching rolls having vertical axes and disposed between said load and said roll of film, said stretching rolls having alternate peripheral ridges and peripheral grooves and being arranged such that the peripheral ridges on each stretching roll mesh with the peripheral grooves on the other stretching roll, passing said film extracted from said roll of film between said meshed stretching rolls, simultaneously stretching said film laterally and longitudinally by rotating said stretching rolls at different speeds and wrapping said load with said stretched film just after stretching thereof and spreading said film laterally between said stretching rolls and said load to widely wrap said load with the spread and stretched film.

2. A wrapping apparatus comprising: means for carrying a load to be wrapped, a support post carrying a roll of wrapping plastic film and disposed at a predetermined distance form said load carrying means; means for creating relative rotation between the roll of wrapping plastic film and the load; a pair of stretching rolls having vertical axes and alternate peripheral ridges and peripheral grooves, said stretching rolls being arranged such that the peripheral ridges on each stretching roll mesh with the peripheral grooves on the other stretching roll, means for rotatively driving said stretching rolls at different speeds to simultaneously stretch the film passing between the stretching rolls laterally and longitudinally, and spreaders arranged between said stretching rolls and said load for spreading said film laterally to widely wrap said load with the spread and stretched film.

3. A wrapping apparatus according to claim 2 wherein said spreaders are arranged such that the diverging angle of said spreaders is adjustable in accordance with the height said load.

4. A wrapping apparatus according to claim 2 wherein the spacing between the stretching rolls is adjustable.

5. A wrapping apparatus according to claim 3, wherein each of said spreaders comprises a support arm and a plurality of disc-like rollers rotatably mounted on said support arm for engaging and holding the edge of the film to spread the stretched film breathwise.

* * * * *